Dec. 9, 1947.        W. D. HERSHBERGER        2,432,196
TIMING WAVE DEVICE
Filed April 12, 1939

Inventor
William D. Hershberger
By
Attorney

Patented Dec. 9, 1947

2,432,196

UNITED STATES PATENT OFFICE 2,432,196

TIMING WAVE DEVICE

William D. Hershberger, Haddonfield, N. J., assignor to Radio Corporation of America, a corporation of Delaware Application April 12, 1939, Serial No. 267,489

9 Claims. (Cl. 315—23)

This invention relates to a timing device for a cathode ray oscillograph and more particularly to a timing device for a pulse echo radio detection device.

Cathode ray oscillographs often employ a sweep voltage of saw-tooth wave form of a known rate of change. If the operating parameters of the oscillograph remain constant, a fixed scale may be used to indicate the timing. However, in practice the applied voltages are likely to vary, but it is feasible to use a constant frequency vacuum tube oscillator to supply a timing voltage. However, this leads to increase complication and to the necessity of maintaining constant frequency.

Among the objects of this invention is to provide a very simple means for obtaining a constant frequency timing wave potential. Another object is to provide means whereby the timing wave may be synchronized with the sweep wave of a cathode ray oscillograph. A further object is to provide means for checking the timing or distance scale of a pulse echo radio detection apparatus.

Figure 1:
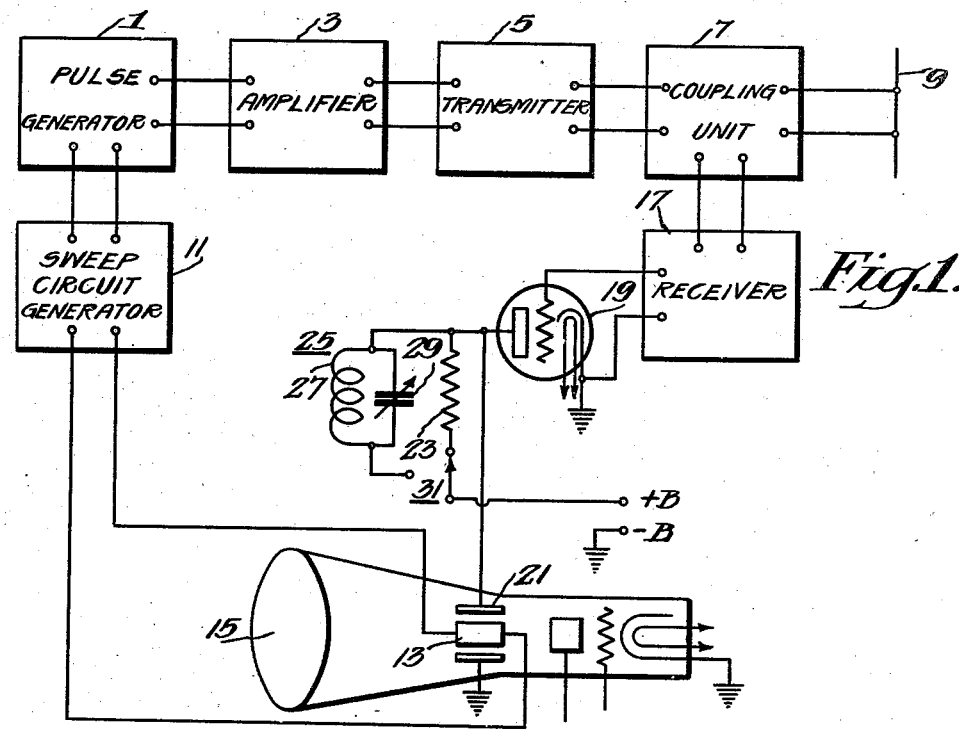
Figure 2:
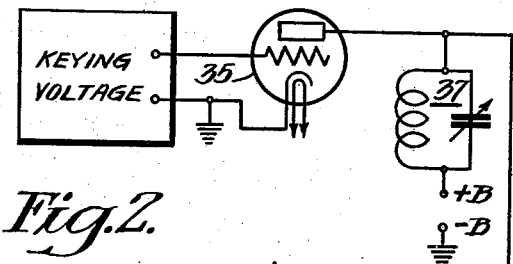
Figure 3:
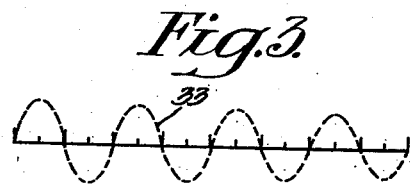
Figure 4:
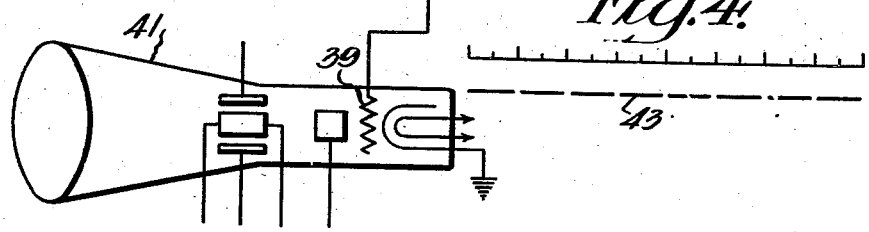

The invention will be described by reference to the accompanying drawing in which Figure 1 is a schematic diagram of one embodiment of the invention; Figure 2 is a modified circuit diagram; and Figures 3 and 4 are graphs illustrating the timing waves.

Referring to Fig. 1, a pulse generator 1 is connected through an amplifier 3 to a transmitter 5 which is connected through a coupling unit 7 to an antenna 9. A sweep circuit generator 11 is connected to the pulse generator 1 and to the deflecting elements 13 of a cathode ray tube 15. The antenna 9 is also coupled to a radio receiver 17. The output of the receiver is indicated as a thermionic tube 19.

The anode circuit of the output tube is normally connected to the second pair of deflecting elements 21 of the cathode ray tube. In the preferred embodiment of the invention, the anode circuit is arranged so that it may include a resistor 23 or an oscillatory circuit 25, comprising an inductor 27 and a capacitor 29. A switch 31 is arranged to selectively connect either the oscillatory circuit or the resistor in the anode circuit.

The operation of the device is as follows: In echo detection, the pulse generator abruptly keys the transmitter whereby pulses of radio frequency energy are radiated. The pulse generator starts the sweep circuit generator which synchronously sweeps the cathode ray along one coordinate. The echo signals, when the switch 31 is set to include the resistor, deflect the cathode ray along another coordinate. The first coordinate corresponds to distance or time. A fixed scale, arranged on the face of the cathode ray tube, indicates the distance the pulse wave has traveled.

When the switch is thrown to include the oscillatory circuit, the initial pulse shock excites the resonant circuit. The potentials derived from the shock-excited circuit are applied to the cathode ray deflecting elements to thereby trace a wave train 33 (see Fig. 3) on the fluorescent screen. The constants of the circuit are preferably chosen so that the ratio of reactance to resistance is high and so that the frequency of the circuit is independent of variation with temperature or the like. Furthermore, the circuit constants are chosen so that a desired periodicity is obtained.

If the period is chosen to correspond to the fixed scale marks, the fixed scale may be compared to the points at which the sine wave potentials are zero. While the amplitude of the oscillations is diminishing, sufficient amplitude and sufficient cycles of the timing wave trace are obtained for the scales usually employed. By way of example, an oscillatory frequency of 2.45 megacycles provides scale markings corresponding to 100 feet indications and a frequency of 186 kcs. provides quarter mile marks.

In a modification of the device shown in Fig. 2, the keying voltage is applied to a vacuum tube 35. The plate circuit of the tube includes an oscillatory circuit 37. The present circuit corresponds to the previously described oscillatory circuit 25. The potentials developed across the oscillatory circuit 37 are applied to the control grid 39 of a cathode ray tube 41. The remaining connections may be arranged similar to the circuit of Fig. 1.

The operation of the circuit of Fig. 2 is different from that of Fig. 1 in that the timing frequency potentials modulate the cathode ray. The modulated ray traces a discontinuous line 43 as indicated in Fig. 4. As in the previous arrangement, the periodicity is chosen to correspond to the desired scale markings.

While the invention has been described with reference to a pulse echo radio system, it should be understood that the timing circuit may be associated with any cathode ray oscillograph. It also follows that the shock-excitation may be accomplished by associating the oscillatory circuit with the sweep circuit, the pulse generator, the amplifier, the transmitter or the receiver. While the damping of the transient voltage in the oscillatory circuit has not proven objectionable, the damping may be overcome by using the tuning wave to control the frequency of a local oscillator and applying the thus controlled local oscillator output potentials to the cathode ray tube as shown.

I claim as my invention:

1. A timing device for a cathode ray tube having a plurality of ray control elements including, in combination, a source of sweep potential, an oscillatory circuit, a source of signals to be indicated, signal means for impulse exciting said oscillatory circuit, means for applying said sweep potential to one of said control elements to deflect said cathode ray, means for applying potentials from said circuit to another of said control elements to vary said ray to provide timing indications of said sweep deflections of said ray and means for applying said source signals to one of said control elements further to deflect said ray to provide indications of said signals timed as a function of said potentials derived from said circuit.

2. A timing device for a cathode ray tube having a plurality of ray control elements including, in combination, a source of sweep potential, an oscillatory circuit, a source of signals to be indicated, signal means for impulse exciting said oscillatory circuit, means for applying said sweep potential to one of said control elements to deflect said cathode ray, means for applying potentials from said circuit to another of said control elements to vary said ray to provide timing indications of said sweep deflections of said ray and means for applying after a variable time interval said source signals to one of said control elements further to deflect said ray to provide indications of said signals timed as a function of said potentials derived from said circuit.

3. A timing device for a cathode ray tube having a plurality of ray deflecting elements including, in combination, a source of sweep potential including an initial pulse, an oscillatory circuit, a source of pulse signals to be indicated, means responsive to said initial pulse for impulse exciting said oscillatory circuit, means for applying said sweep potential to one of said deflecting elements to deflect said cathode ray, means for applying potentials from said circuit to another of said deflecting elements to vary said ray to provide timing indications of said sweep deflections of said ray and means for applying said pulse signals to one of said deflecting elements further to deflect said ray to provide indications of said signals timed as a function of said potentials derived from said circuit.

4. A timing device for a cathode ray tube having a plurality of ray deflecting elements and a ray intensity control element including, in combination, a source of sweep potential including a potential pulse, an oscillatory circuit, a source of pulse signals to be indicated, means responsive to said potential pulse for impulse exciting said oscillatory circuit, means for applying said sweep potential to one of said deflecting elements to deflect said cathode ray, means for applying potentials from said circuit to said ray intensity control element to vary the intensity of said ray to provide timing indications of said sweep deflections of said ray and means for applying said pulse signals to another of said deflecting elements further to deflect said ray to provide indications of said signals timed as a function of said potentials derived from said circuit.

5. A timing device for a cathode ray tube having a plurality of ray deflection elements including, in combination, a source of sweep potential, an oscillatory circuit having a known periodicity, a source of pulse signals to be indicated, means responsive to said pulse signals for impulse exciting said oscillatory circuit at its resonant frequency, means for applying said sweep potential to one of said deflection elements to deflect said cathode ray, means for applying potentials from said circuit to another of said deflection elements to deflect said ray to provide timing indications on said sweep deflections of said ray and means for applying said pulse signals to one of said deflecting elements further to deflect said ray to provide indications of said signals timed as a function of said potentials derived from said circuit.

6. A timing device for a cathode ray tube having a plurality of ray deflection elements and a ray intensity control element including, in combination, a sweep circuit connected to one of said deflection elements for deflecting said ray, an oscillatory circuit having a known periodicity, a source of pulse signals to be indicated, means responsive to one of said pulse signals for impulse exciting said oscillatory circuit at said period, means for applying potentials from said circuit to said ray intensity control element to vary the intensity of said ray to provide timing indications on said sweep deflections of said ray, and means for applying said pulse signals to another of said deflecting elements further to deflect said ray to provide indications of said signals timed as a function of said potentials derived from said circuit.

7. The method of checking the timing sweep of a cathode ray having a saw tooth sweep which includes applying the abruptly varying potential of said sweep to generate impulse excited oscillations, deriving potentials from said oscillations, and deflecting said cathode ray in accordance with said oscillations.

8. The method of timing the sweep of a cathode ray oscillograph which includes deriving a potential pulse, applying said pulse to establish oscillatory currents of a known frequency, deriving oscillatory potentials from said oscillations, and varying said sweep as a function of said oscillatory potentials.

9. The method of checking the timing scale of a radio pulse echo detecting device having an oscillatory circuit therein which includes applying said pulse to said oscillatory circuit to establish shock excited oscillatory currents of known period, deriving oscillatory potentials from said oscillatory currents, applying said potentials to cause timing indications to appear on said scale for checking said scale against said indications.

WILLIAM D. HERSHBERGER.

REFERENCES CITED

The following references are of record in the file of this patent:

UNITED STATES PATENTS

| Number | Name | Date |
| --- | --- | --- |
| 2,084,760 | Beverage | June 22, 1937 |
| 1,687,882 | Nichols | Oct. 16, 1928 |
| 2,082,317 | Barber | June 1, 1937 |